United States Patent Office 3,294,853
Patented Dec. 27, 1966

3,294,853
SELECTIVE HYDROGENATION OF TRANS,CIS-1,5-CYCLODECADIENE TO CIS-CYCLODECENE
Joseph T. Arrigo, Mount Prospect, Ill., assignor to Universal Oil Products Company, Des Plaines, Ill., a corporation of Delaware
No Drawing. Filed Feb. 4, 1965, Ser. No. 430,459
7 Claims. (Cl. 260—666)

This invention relates to the preparation of cis-cyclodecene. It is an object of this invention to present a novel process for the selective hydrogenation of trans,cis-1,5-cyclodecadiene to form the desired cis-cyclodecene.

The trans,cis-1,5-cyclodecadiene, selectively hydrogenated to form the cis-cyclodecene in accordance with the process of this invention, is known in the art, being prepared, for example, by the cyclocooligomerization of two moles of butadiene with one mole of ethylene in the presence of a catalyst described as a π-allyl nickel complex. A description of the trans,cis-1,5-cyclodecadiene, as well as its preparation, is found in Angewandte Chemie International Edition, vol. 2, No. 3, page 105, March, and vol. 3, No. 10, page 702, October 1964. The trans,cis-1,5-cyclodecadiene can be converted to cis-cyclodecene by conventional hydrogenation techniques although selectivity is markedly less than desired and inadequate for industrial use. The process of this invention enables one to achieve a selectivity in excess of 89% at 100% conversion. Optimum conversion is desirable since it is extremely difficult to separate the unconverted cyclodecadiene by conventional means for recycle in a continuous process or recovery in a batch process. It has been discovered that the selective hydrogenation of trans,cis-1,5-cyclodecadiene is drastically impaired by the formation of a cyclodecadiene isomer, tentatively identified as a cis-cis-1,6-cyclodecadiene. This isomer, melting at 26.5–28° C., has been isolated and found to be extremely difficult to hydrogenate with any appreciable degree of selectivity, the fully saturated cyclodecane comprising a substantial portion of the hydrogenation product. By the process of this invention, formation of this undesirable isomeric cyclodecadiene is minimized and trans,cis-1,5-cyclodecadiene is converted to cis-cyclodecene in excess of about 89% at 100% conversion.

In one of its broad aspects, the present invention embodies a process for the preparation of cis-cyclodecene which comprises reacting hydrogen and trans,cis-1,5-cyclodecadiene under hydrogen pressure and at a temperature of from about 0° C. to about 75° C. in contact with a catalyst comprising an alkali metal borohydride-reduced nickel salt.

A more specific embodiment of the process of this invention is in a process for the preparation of cis-cyclodecene which comprises reacting hydrogen and trans,cis-1,5-cyclodecadiene at a hydrogen pressure of from about 400 p.s.i.g. to about 750 p.s.i.g. and at a temperature of from about 0° C. to about 25° C. in contact with a catalyst comprising a sodium borohydride-reduced nickel acetate.

The selective hydrogenation of trans,cis-1,5-cyclodecadiene as herein contemplated is effected in contact with a nickel catalyst which has been tentatively described in the art as nickel boride although its exact composition has not been ascertained to date. The nickel catalyst may be more aptly described as the reaction product of a reducible nickel compound and an alkali metal borohydride reducing agent. For example, one suitable method described in the art for the preparation of the borohydride-reduced nickel catalyst comprises reacting an alkali metal borohydride, such as sodium borohydride, with a suitable nickel compound, for example, nickel acetate, in alcoholic or aqueous solution at about room temperature under nitrogen and recovering the finely divided, black, nickel-containing precipitate which forms. Other suitable alkali metal borohydrides include lithium borohydride, potassium borohydride, and the like. Other suitable compounds include water-soluble or alcohol-soluble nickel salts such as nickel formate, nickel chloride, nickel nitrate, nickel sulfate, and the like.

Selective hydrogenation of the cyclodecadiene is suitably effected within a period of from about 1 to about 48 hours at a temperature of from about 0° C. to about 75° C., the rate of hydrogenation decreasing with temperature. Selectivity drops off somewhat with increasing temperature but is substantially unaffected within the preferred temperature range of from about 0° C. to about 25° C. Although it is desired to hydrogenate only one of two double bonds, selectivity is not impaired in the presence of excess hydrogen. The process is suitably carried out under hydrogen pressure which may be from about 30 p.s.i.g. to about 1500 p.s.i.g., a hydrogen pressure in the range of from about 400 p.s.i.g. to about 750 p.s.i.g. being preferred.

The process of this invention can be effected batchwise or in a continuous flow type of operation. For example, a high pressure reaction vessel such as an autoclave designed for the introduction of hydrogen and equipped with temperature control means can be employed. The catalyst is placed in the autoclave together with the cyclodecadiene charge. It is preferable to include an inert solvent. Cyclohexane is a preferred solvent, though other paraffinic or aromatic hydrocarbons, being substantially inert to hydrogenation at reaction conditions may be employed. The autoclave is flushed one or more times with dry nitrogen and then pressured to the desired initial pressure with hydrogen. Since hydrogen is consumed in the reaction, progress of the reaction can be ascertained with reference to pressure although it may be desired to maintain a constant pressure by the continuous or intermittent addition of hydrogen to the reaction vessel. On completion of an adequate residence time at reaction conditions, the autoclave is vented and the liquid contents decanted from the catalyst. The reaction product at about 100% trans,cis-1,5-cyclodecadiene conversion is stable at distillation conditions even at atmospheric pressure and is readily distilled under nitrogen to yield the desired cyclodecene product.

The cyclodecadiene can be selectively hydrogenated to cyclodecene in a continuous manner on a once-through basis. For example, the cyclodecadiene together with a substantially inert solvent, such as cyclohexane, is charged to a high pressure reaction chamber equipped with temperature control means and containing the catalyst disposed on an inert support in a fixed bed therein. The reaction chamber is maintained at the desired pressure by means of hydrogen charged thereto either in a separate stream or commingled with the cyclodecadiene charge. The reactor effluent is recovered in a high pressure separator adequately cooled to insure separation of liquid and gaseous phases. The gaseous phase comprising hydrogen is recycled to the reaction chamber while the liquid phase is metered through a pressure reducing valve and passed to a distillation column for the separation of solvent and by-products and recovery of cyclodecadiene.

The following examples are presented in illustration of the process of this invention and are not intended as an undue limitation on the generally broad scope of the invention as set out in the appended claims.

*Example I*

A borohydride-reduced nickel catalyst was prepared by the sodium borohydride reduction of 0.40 gram of nickel acetate tetrahydrate in absolute ethanol, forming a finely divided black precipitate. This nickel-containing precipitate was separated by means of a centrifuge and washed first with absolute ethanol and then cyclohexane before use. The catalyst thus prepared, 3.4 grams of trans,cis-1,5-cyclodecadiene (97% pure), and 19.5 grams of cyclohexane were sealed in a high pressure glass vessel of 100 cubic centimeters capacity which was thereafter pressured to 375 pounds per square inch gauge with hydrogen. The reaction vessel was immersed in a liquid bath by means of which a reaction temperature of about 18° C. was maintained. The reaction mixture was maintained in an agitated state by means of a magnetic stirrer. After a period of about 5.5 hours the reaction vessel was depressured and the liquid content recovered and analyzed by gas-liquid chromatography. Analysis indicated about an 89% conversion of trans,cis-1,5-cyclodecadiene to cis-cyclodecene at 97% trans,cis-1,5-cyclodecadiene conversion. About 1% was converted to cyclodecane and about 7% to an isomeric cyclodecadiene thought to be cis,cis-1,6-cyclodecadiene.

*Example II*

That nickel reduced by an alkali metal borohydride exhibits a high degree of selectivity in contrast to other metals known to promote hydrogenation and which have been similarly reduced, is illustrated by this example wherein a borohydride-reduced platinum is contrasted with the borohydride-reduced nickel of the previous example. The borohydride-reduced platinum was prepared by the sodium borohydride-reduction of aqueous chloroplatinic acid (1.3 milliliters containing 0.0307 gram of Pt/milliliter) in absolute ethanol, forming a finely divided black precipitate. This black, platinum-containing precipitate was separated by means of a centrifuge and washed as above with ethanol and cyclohexane prior to use. The catalyst thus prepared, 3.4 grams of trans,cis-1,5-cyclodecadiene (97% pure), and 19.5 grams of cyclohexane were sealed in a high pressure glass vessel of 100 cc. capacity which was thereafter pressured to 375 pounds per square inch gauge with hydrogen. The reactants were further treated as described in Example I. Analysis of the liquid product indicated about a 79% conversion of trans,cis-1,5-cyclodecadiene to cis-cyclodecene at 100% trans,cis-1,5-cyclodecadiene conversion. About 5% was converted to cyclodecane and about 16% to an isomeric cyclodecadiene thought to be cis-cis-1,6-cyclodecadiene.

I claim as my invention:
1. A process for the preparation of cis-cyclodecene which comprises reacting hydrogen and trans,cis-1,5-cyclodecadiene under hydrogen pressure and at a temperature of from about 0° C. to about 75° C. in contact with the reaction product of a reducible nickel compound and an alkali metal borohydride.

2. A process for the preparation of cis-cyclodecene which comprises reacting hydrogen and trans,cis-1,5-cyclodecadiene at a hydrogen pressure of from about 30 p.s.i.g. to about 1500 p.s.i.g. and at a temperature of from about 0° C. to about 75° C. in contact with the reaction product of a reducible nickel compound and an alkali metal borohydride.

3. A process for the preparation of cis-cyclodecene which comprises reacting hydrogen and trans,cis-1,5-cyclodecadiene at a hydrogen pressure of from about 400 p.s.i.g. to about 750 p.s.i.g. and at a temperature of from about 0° C. to about 25° C. in contact with the reaction product of a reducible nickel compound and an alkali metal borohydride.

4. A process for the preparation of cis-cyclodecene which comprises reacting hydrogen and trans,cis-1,5-cyclodecadiene at a hydrogen pressure of from about 400 p.s.i.g. to about 750 p.s.i.g. and at a temperature of from about 0° C. to about 25° C. in contact with the reaction product of a reducible nickel compound and sodium borohydride.

5. A process for the preparation of cis-cyclodecene which comprises reacting hydrogen and trans,cis-1,5-cyclodecadiene at a hydrogen pressure of from about 400 p.s.i.g. to about 750 p.s.i.g. and at a temperature of from about 0° C. to about 25° C. in contact with the reaction product of a reducible nickel compound and potassium borohydride.

6. A process for the preparation of cis-cyclodecene which comprises reacting hydrogen and trans-cis-1,5-cyclodecadiene at a hydrogen pressure of from about 400 p.s.i.g. to about 750 p.s.i.g. and at a temperature of from about 0° C to about 25° C. in contact with the reaction product of a reducible nickel compound and lithium borohydride.

7. A process for the preparation of cis-cyclodecene which comprises reacting hydrogen and trans,cis-1,5-cyclodecadiene at a hydrogen pressure of from about 400 p.s.i.g. to about 750 p.s.i.g. and at a temperature of from about 0° C. to about 25° C. in contact with the reaction product of nickel acetate and sodium borohydride.

References Cited by the Examiner
UNITED STATES PATENTS
3,022,359  2/1962  Wiese et al. _____ 260—666

DELBERT E. GANTZ, *Primary Examiner.*

V. O'KEEFE, *Assistant Examiner.*